(12) United States Patent
Guarrero

(10) Patent No.: US 12,359,882 B2
(45) Date of Patent: Jul. 15, 2025

(54) COMPOSITIONS, SYSTEMS, AND NEURAL NETWORKS FOR BIDIRECTIONAL ENERGY TRANSFER, AND THERMALLY ENHANCED SOLAR ABSORBERS

(71) Applicant: Generative Technology Operatives, LLC, Erie, CO (US)

(72) Inventor: Brett P. Guarrero, Telluride, CO (US)

(73) Assignee: Generative Technology Operatives, LLC, Erie, CO (US)

( * ) Notice: Subject to any disclaimer, the term of this patent is extended or adjusted under 35 U.S.C. 154(b) by 389 days.

(21) Appl. No.: 17/942,158

(22) Filed: Sep. 11, 2022

(65) Prior Publication Data

US 2023/0075059 A1    Mar. 9, 2023

Related U.S. Application Data

(63) Continuation of application No. 17/185,090, filed on Feb. 25, 2021, now Pat. No. 11,441,853, which is a
(Continued)

(51) Int. Cl.
*F28F 21/04* (2006.01)
*A47J 36/02* (2006.01)
(Continued)

(52) U.S. Cl.
CPC ............... *F28F 21/04* (2013.01); *A47J 36/02* (2013.01); *C04B 14/024* (2013.01);
(Continued)

(58) Field of Classification Search
CPC .......... F28F 21/04; E01C 5/065; E01C 11/26; E01C 11/265; E04B 5/48; G21F 1/042; H01B 1/18
(Continued)

(56) References Cited

U.S. PATENT DOCUMENTS 3,626,149 A * 12/1971 Carney .................... C04B 28/04
165/905
8,123,163 B2 * 2/2012 McCoskey .............. B60L 53/12
244/110 A
(Continued)

*Primary Examiner* — Jon T. Schermerhorn, Jr.
(74) *Attorney, Agent, or Firm* — O'Connor & Company; Ryan P. O'Connor

(57) ABSTRACT

The present invention provides a bidirectional energy-transfer system comprising: a thermally and/or electrically conductive concrete, disposed in a structural object; a location of energy supply or demand that is physically isolated from, but in thermodynamic and/or electromagnetic communication with, the thermally and/or electrically conductive concrete; and a means of transferring energy between the structural object and the location of energy supply or demand. The system can be a single node in a neural network. The thermally and/or electrically conductive concrete includes a conductive, shock-absorbing material, such as graphite. Preferred compositions are disclosed for the thermally and/or electrically conductive concrete. The bidirectional energy-transfer system may be present in a solar-energy collection system, a grade beam, an indoor radiant flooring system, a structural wall or ceiling, a bridge, a roadway, a driveway, a parking lot, a commercial aviation runway, a military runway, a grain silo, or pavers, for example.

20 Claims, 10 Drawing Sheets

Related U.S. Application Data continuation of application No. 15/658,724, filed on Jul. 25, 2017, now Pat. No. 10,935,333.

(60) Provisional application No. 62/367,570, filed on Jul. 27, 2016.

(51) Int. Cl.

| | |
|---|---|
| *C04B 14/02* | (2006.01) |
| *C04B 28/00* | (2006.01) |
| *C04B 28/02* | (2006.01) |
| *C09K 5/04* | (2006.01) |
| *C09K 5/06* | (2006.01) |
| *C09K 5/14* | (2006.01) |
| *E01C 5/06* | (2006.01) |
| *E01C 7/14* | (2006.01) |
| *E01C 11/00* | (2006.01) |
| *E01C 11/26* | (2006.01) |
| *E04B 5/48* | (2006.01) |
| *G21F 1/04* | (2006.01) |
| *H01B 1/18* | (2006.01) |
| *A47C 5/00* | (2006.01) |
| *A63C 19/00* | (2006.01) |
| *C04B 111/00* | (2006.01) |
| *C04B 111/20* | (2006.01) |
| *C04B 111/52* | (2006.01) |
| *C04B 111/60* | (2006.01) |
| *C04B 111/94* | (2006.01) |
| *E01C 9/00* | (2006.01) |
| *E01D 19/12* | (2006.01) |
| *E02D 27/02* | (2006.01) |
| *E04B 2/84* | (2006.01) |
| *E04B 5/32* | (2006.01) |
| *E04H 5/08* | (2006.01) |
| *F16F 1/36* | (2006.01) |

(52) U.S. Cl.
CPC ............ *C04B 28/006* (2013.01); *C04B 28/02* (2013.01); *C09K 5/048* (2013.01); *C09K 5/063* (2013.01); *C09K 5/14* (2013.01); *E01C 5/065* (2013.01); *E01C 7/142* (2013.01); *E01C 11/00* (2013.01); *E01C 11/26* (2013.01); *E01C 11/265* (2013.01); *E04B 5/48* (2013.01); *G21F 1/042* (2013.01); *H01B 1/18* (2013.01); *A47C 5/00* (2013.01); *A63C 19/00* (2013.01); *A63C 2203/20* (2013.01); *C04B 2111/00465* (2013.01); *C04B 2111/00603* (2013.01); *C04B 2111/0075* (2013.01); *C04B 2111/00758* (2013.01); *C04B 2111/00775* (2013.01); *C04B 2111/00784* (2013.01); *C04B 2111/00862* (2013.01); *C04B 2111/00965* (2013.01); *C04B 2111/2046* (2013.01); *C04B 2111/2084* (2013.01); *C04B 2111/52* (2013.01); *C04B 2111/60* (2013.01); *C04B 2111/94* (2013.01); *C04B 2201/32* (2013.01); *C04B 2201/50* (2013.01); *E01C 9/00* (2013.01); *E01D 19/125* (2013.01); *E02D 27/02* (2013.01); *E04B 2/84* (2013.01); *E04B 5/32* (2013.01); *E04H 5/08* (2013.01); *F16F 1/3605* (2013.01); *Y02P 40/10* (2015.11)

(58) Field of Classification Search
USPC .......................................... 165/48.1
See application file for complete search history.

(56) References Cited

U.S. PATENT DOCUMENTS

| | | | | |
|---|---|---|---|---|
| 10,256,006 | B1 * | 4/2019 | Tuan ................. | H01B 1/16 |
| 10,935,333 | B2 * | 3/2021 | Guarrero ............ | C09K 5/14 |
| 11,441,853 | B2 * | 9/2022 | Guarrero ............ | C09K 5/14 |
| 11,683,862 | B2 * | 6/2023 | Brown ............... | H05B 3/03 |
| | | | | 219/510 |
| 2017/0370693 | A1 * | 12/2017 | Klooster ........... | G01M 5/0083 |
| 2022/0010501 | A1 * | 1/2022 | Fulham-Lebrasseur ........ | |
| | | | | H05B 3/286 |
| 2023/0051892 | A1 * | 2/2023 | Nguyen ............. | F28F 21/02 |
| 2023/0358030 | A1 * | 11/2023 | Yehia ............... | E04B 1/34321 |
| 2025/0065534 | A1 * | 2/2025 | Godelmann ....... | B28B 13/0225 |

* cited by examiner

COMPOSITIONS, SYSTEMS, AND NEURAL NETWORKS FOR BIDIRECTIONAL ENERGY TRANSFER, AND THERMALLY ENHANCED SOLAR ABSORBERS

PRIORITY DATA

This patent application is a continuation of U.S. Pat. No. 11,441,853, issued on Sep. 13, 2022, which is a continuation of U.S. Pat. No. 10,935,333, issued on Mar. 2, 2021, which is a non-provisional patent application of U.S. Provisional Patent App. No. 62/367,570, filed on Jul. 27, 2016, each of which is hereby incorporated by reference herein.

FIELD OF THE INVENTION

The present invention pertains to compositions and systems for capturing and releasing energy in a neural network system.

BACKGROUND OF THE INVENTION

Pavement has various uses in a multitude of locations. Pavement in its various forms is prone to cracking, chipping, fracturing, potholing, crumbling, dissolving, spalling, and allowing water and salt migration to undermine structural reinforcing elements. Some pavements are used outdoors and some are used indoors. Climate control for pavement has been the subject of great debate as it has traditionally been used to insulate or mask temperature migration. Because of pavement's insulative properties, short life span, and high energy consumption, it is very often the enemy of the green building industry. With high resistivity and slow reaction time, the pavements in use have created heat-island effects and exacerbated poor air quality.

Traditional concrete or asphalt pavements and pavestones are not very conductive, requiring a lot of energy to remove snow and ice from these surfaces, for example. The obvious solution is to hire a team of people with shovels to clear the area, which is often not practical in many remote settings. It also comes at the expense of extensive damage to the surfaces from physical chipping, scraping, and salting of the surfaces. The snow can be plowed and trucked out, with some of the same concerns as hand removal. Lastly the snow can be heated. The heat can come from many sources; most commonly it is accomplished with electric mats or a hot glycol system.

Commercially available products with enhancements have been available since the 1960s and before, and are the subject of several prior patents. Those products had trouble with high heat concentration; in some cases temperatures in excess of 260° C. were associated with products used to deliver heat to the surface of the material in an effort to eliminate snow and ice from the surface. These were all one-way devices designed to send energy into pavement. Damage to the infrastructure and pavement was often the case.

Improved concrete compositions and systems are desired to address the above-mentioned shortcomings as well as provide better concrete-containing products and structures for use in various industries.

SUMMARY OF THE INVENTION

Some variations of the invention provide a bidirectional thermal energy-transfer system comprising:

a thermally conductive concrete, in cured form and disposed in a structural object;

a location of energy supply or demand that is physically isolated from, but in thermodynamic communication with, the thermally conductive concrete; and a means of transferring thermal energy between the structural object and the location of energy supply or demand, for heating, cooling, or a combination thereof.

In some embodiments, the bidirectional thermal energy-transfer system is present as a single node in a network comprising a plurality of network nodes.

In some embodiments, the thermally conductive concrete includes a thermally conductive, shock-absorbing material, such as a carbonaceous material.

In certain embodiments, the thermally conductive concrete comprises carbon, one or more metals and/or conductive polymers, aggregate, cement, and optionally water, wherein the carbon is present in the composition at a concentration from about 5 vol % to about 35 vol % on a dry basis, and wherein the one or more metals and/or conductive polymers are present in the composition at a concentration from about 0.5 vol % to about 10 vol % on a dry basis.

The means of transferring thermal energy between the structural object and the location of energy supply or demand may include a matrix of pipes, tubes, or other containment regions, wherein the pipes, tubes, or other containment regions contain a thermal energy-transfer medium. In some embodiments, the thermal energy-transfer medium is water or a mixture of water and non-aqueous liquid. In other embodiments, the thermal energy-transfer medium is a liquid, non-aqueous heat-transfer fluid. The thermal energy-transfer medium may be configured to operate at a temperature difference less than 20° C. between the energy-transfer medium and the structural object.

The thermally conductive concrete may be characterized by a bulk average thermal conductivity of about 2 W/m. K or more. In these or other embodiments, the thermally conductive concrete may be characterized by a compressive strength of about 2500 psi or more and/or a flexural strength of about 500 psi or more. The thermally conductive concrete contains less than 1 vol % entrained air, in certain embodiments.

The bidirectional thermal energy-transfer system may be present in a solar-energy collection system, a grade beam, an indoor radiant flooring system, a structural wall or ceiling, a bridge, a roadway, a driveway, a parking lot, a commercial aviation runway, a military aviation runway, a grain silo or other grain container, or one or more pavers, for example.

Other variations of the invention provide a thermally conductive concrete composition, the composition comprising carbon, one or more metals and/or conductive polymers, aggregate, cement, and optionally water, wherein the carbon is present in the composition at a concentration from about 5 vol % to about 35 vol % on a dry basis, and wherein the one or more metals and/or conductive polymers are present in the composition at a concentration from about 0.5 vol % to about 10 vol % on a dry basis.

In some embodiments, the carbon is present in the composition at a concentration from about 10 vol % to about 25 vol % on a dry basis. The carbon may include, or be derived from, coal waste. In various embodiments, the carbon is selected from the group consisting of graphite, graphene, carbon fibers, carbon nanostructures, coal waste, activated carbon, coke, pitch coke, petroleum coke, charcoal, biochar, and combinations thereof.

In some embodiments, the one or more metals and/or conductive polymers are present in the composition at a concentration from about 1 vol % to about 5 vol % on a dry basis. The one or more metals and/or conductive polymers may include metals contained in, or derived from, metal waste. In various embodiments, the one or more metals and/or conductive polymers include metals selected from the group consisting of iron, magnesium, manganese, zinc, aluminum, cadmium, lead, tin, nickel, copper, steel, stainless steel, brass, bronze, and combinations thereof. In certain embodiments, the carbon consists of graphite and the one or more metals and/or conductive polymers consist of steel fibers.

In the thermally conductive concrete composition, the aggregate includes fine aggregate, coarse aggregate, or a mixture thereof. In some embodiments, the cement is Portland Cement. The composition may include water.

In some embodiments, the thermally conductive concrete composition is present in cured form.

The thermally conductive concrete composition may contains less than 4 vol % entrained air, such as about 1 vol % entrained air or less.

In some embodiments, the carbon is characterized by an average carbon-particle size from about 1 micron to about 1 millimeter, such as from about 10 microns to about 200 microns.

The thermally conductive concrete may be characterized by a bulk average thermal conductivity of about 2 W/m K or more.

The thermally conductive concrete composition may be characterized by a compressive strength of about 2500 psi or more and/or a flexural strength of about 500 psi or more.

The thermally conductive concrete composition may be disposed in thermal communication with a thermal energy-transfer medium.

In some embodiments, the concrete composition is also electrically conductive, and the composition is disposed in electrical communication with an electricity-conducting network.

Some variations of the invention provide bidirectional electrical energy-transfer systems comprising:
- an electrically conductive concrete, in cured form and disposed in a structural object;
- a location of electrical energy supply or demand, wherein the location of electrical energy supply or demand is physically isolated from, but in electrical communication with, the electrically conductive concrete; and
- a means of transferring electrical energy between the structural object and the location of electrical energy supply or demand.

The bidirectional electrical energy-transfer system may be present as a single node in a neural network comprising a plurality of network nodes. In certain embodiments, the bidirectional electrical energy-transfer system is present as a single node in a network comprising a plurality of antennas, electrical receivers, and emitters.

The electrically conductive concrete may include an electrically conductive, shock-absorbing material, such as a carbonaceous material (e.g., graphite). The electrically conductive concrete may comprise carbon, one or more metals and/or conductive polymers, aggregate, cement, and optionally water, wherein the carbon is present in the composition at a concentration from about 5 vol % to about 35 vol % on a dry basis, and wherein the one or more metals and/or conductive polymers are present in the composition at a concentration from about 0.5 vol % to about 10 vol % on a dry basis. Preferably the composition contains less than 1 vol % entrained air. The electrically conductive concrete may be characterized by a compressive strength of about 2500 psi or more, such as 4000 psi or more.

The means of transferring electrical energy between the structural object and the location of energy supply or demand may be selected from the group consisting of metal wiring, metal mesh, metal layers, a continuous conductive network, and combinations thereof.

The electrically conductive concrete functions as an integrated antenna without a ground plane. The electrically conductive concrete is capable of wirelessly receiving electricity via electromagnetic fields. The electrically conductive concrete is capable of capacitively storing electricity when exposed to electromagnetic radiation.

The system optionally contains a photovoltaic material for converting incoming light into electricity.

In some embodiments, the system further comprises a plurality of embedded conductors selected from the group consisting of metal wiring, metal mesh, metal layers, a continuous conductive network, and combinations thereof.

The system may be present in a solar-energy collection system. The system may be present in a bridge, roadway, driveway, parking lot, commercial aviation runway, or military aviation runway.

Optionally, the electrically conductive concrete is capable of wirelessly transmitting electricity via electromagnetic fields.

DETAILED DESCRIPTION OF EMBODIMENTS OF THE INVENTION

Figure 1:
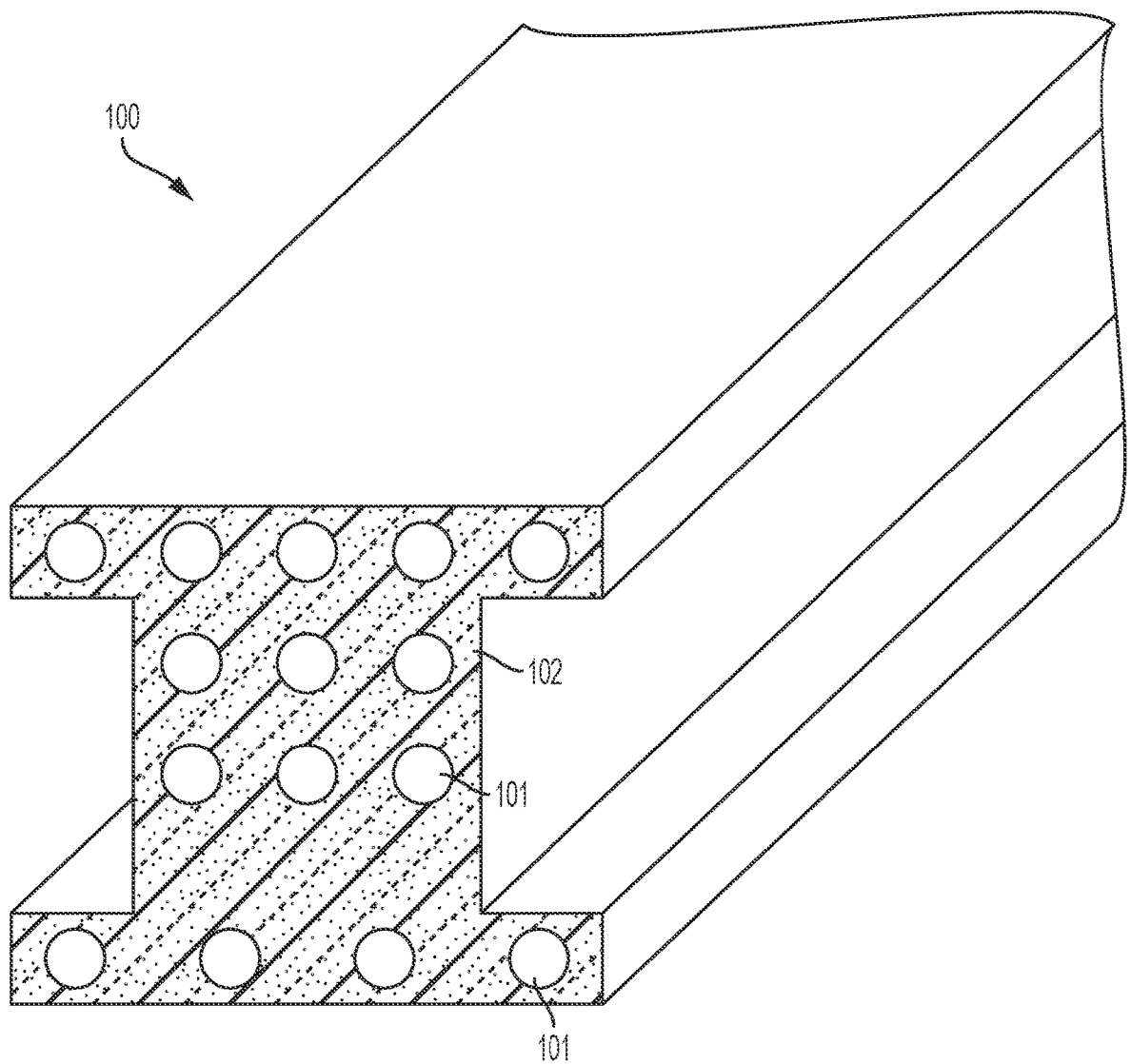
FIG. 1 shows an exemplary embodiment of a grade beam, in some embodiments of the invention.

The compositions, systems, structures, methods, and processes of the present invention will be described in detail by reference to various non-limiting embodiments and figures.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing parameters, conditions, results, and so forth used in the specification and claims are to be understood as being modified in all instances by the term "about." Accordingly, unless indicated to the contrary, the numbers set forth in the following specification and attached claims are approximations that may vary depending upon specific algorithms and calculations.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

No embodiments described herein shall be limited by any theory or speculation regarding reaction mechanisms, mass-transfer mechanisms, heat-transfer mechanisms, and the like.

Variations of the present invention are premised on adaptable, integrated building products designed to capture, transfer, deliver, deploy, and/or release energy. The systems described herein allow both passive and active transfer from a source of energy to one or more locations where captured energy can be effective. High-level and low-level energy can be transported any time of day or night. When a space or object is configured to accept BTUs (i.e. heat), a space or object will begin to heat. Conversely, by rejecting BTUs (i.e. heat), a space or object will begin to cool.

As discussed herein, highly conductive concrete is coupled with configurations to move energy in a controlled or uncontrolled system (as described herein). Such a system may be customized to maximize environmental and usage requirements versus overall energy performance requirements.

The uses are unlimited, including heating/cooling of residential and commercial facilities, snow melt, industrial usage (e.g., in agriculture, oil and gas, and greenhouse production), and power generation. For example the present system may be configured as an indoor/outdoor system of energy exchange, without a solar panel or earth-coupled heat pump necessary. Other applications include institutional applications (e.g., schools and hospitals), transportation markets (e.g., roads and runways), and cold storage warehouse applications. Significant energy reduction (savings), such as 25%, 50%, 75%, or more, can be achieved compared to otherwise-identical systems without the benefit of the present invention.

The present invention allows users to capture and distribute energy (solar, thermal, electrical, or combinations thereof) effectively in the context of the energy it takes to operate the system as a whole. The present invention achieves these properties while meeting or exceeding structural requirements.

Some variations provide a bidirectional thermal energy-transfer system comprising:
  a thermally conductive concrete, in cured form and disposed in a structural object;
  a location of energy supply or demand selected from heating, cooling, or a combination thereof, wherein the location of energy supply or demand is physically isolated from, but in thermodynamic communication with, the thermally conductive concrete; and
  a means of transferring thermal energy between the structural object and the location of energy supply or demand.

A "structural object" should be construed broadly to mean various objects, layers, or regions of material containing an amount of cured thermally conductive concrete. A structural object may be an engineering structure such as a concrete beam or a concrete slab. A structural object may also be a layer of cured thermally conductive concrete, which may be relatively thin, such as a wall, roof layer, or radiant floor.

By "bidirectional" it is meant that energy transfer can be accomplished in either direction, i.e. from the structural object to the location of energy supply or demand (e.g., for heating), or from the location of energy supply or demand to the structural object (e.g., for cooling the location of energy supply or demand).

In some embodiments, the system is present as a single node in a network (e.g., a neural network) comprising a plurality of interconnected network nodes (see below).

By "location of energy supply or demand" it is meant a location, region of material, region of space, or the atmosphere at which it is intended to either withdraw heat or to reject heat. Heat may be withdrawn from a heat-transfer medium, materials present in the system, and/or ambient. Heat may be rejected to a heat-transfer medium, materials present, and/or ambient.

The desired heating or cooling can be at the location of energy supply or demand (e.g., a room), or it can be at the structural object itself, such as when it is desired to heat or cool the concrete structural object containing the thermally conductive concrete. In some embodiments, the location of energy supply or demand is a first structural object containing thermally conductive concrete, and thermal energy is transferred (in either direction) between the first structural object and a second structural object that also contains thermally conductive concrete.

In some embodiments, bidirectional energy transfer can be achieved simultaneously, i.e. heat is being transferred both ways at the same time, through different means of transferring thermal energy. For example, a thermally conductive concrete may accept heat by solar radiation (or other electromagnetic waves) while simultaneously rejecting thermal energy to a heat-transfer medium.

The thermally conductive concrete preferably includes a thermally conductive, shock-absorbing material, such as a carbonaceous material. In some embodiments, the carbonaceous material is graphite.

In certain embodiments, the primary ingredients of the thermally conductive concrete are water, sand, aggregate, coal waste, metal waste, and Portland cement. These elements are combined in specific ratios depending on the energy and structural requirements of any particular application.

In some embodiments of the bidirectional thermal energy-transfer system, the thermally conductive concrete comprises carbon, one or more metals and/or conductive polymers, aggregate, cement, and optionally water, wherein the carbon is present in the composition at a concentration from about 5 vol % to about 35 vol % on a dry basis, and wherein the one or more metals and/or conductive polymers are present in the composition at a concentration from about 0.5 vol % to about 10 vol % on a dry basis.

The means of transferring thermal energy between the structural object and the location of energy supply or demand may include a matrix of pipes, tubes, capillaries, manifolding, or other containment regions, wherein the pipes, tubes, or other containment regions contain a thermal energy-transfer medium. The thermal energy-transfer medium may be water, for example, providing efficient hydronic control. In some embodiments, the thermal energy-transfer medium is a mixture of water and non-aqueous liquid, such as an anti-freeze solution. In some embodiments, the thermal energy-transfer medium is a liquid, non-aqueous heat-transfer fluid. In certain embodiments, the thermal energy-transfer medium is a solid heat-transfer material, such as a metal, a salt, a conductive gel, or an ionic polymer. Note that in the case of solid heat-transfer materials, the heat-transfer materials may be self-contained (e.g., metal wires) within the thermally conductive concrete.

For example, energy arriving at a surface (e.g., impacting the surface from solar radiation, rising up from the ground below, etc.) may be collected or harvested, and then conveyed to another place for use. The conveyance may be accomplished via a series of embedded conductors within the bidirectional thermal energy-transfer system, or otherwise in physical contact with the bidirectional thermal energy-transfer system, for example. The surfaces may be sidewalks, driveways, patios, pool decks, elevated platforms, roofs (e.g. concrete shingles or roof tiles), roadways, runways, and so on.

In some embodiments, the bidirectional thermal energy-transfer system is capable of operating at low temperature differences. For example, the thermal energy-transfer medium may be configured to operate at a temperature difference less than 20° C. between the energy-transfer medium and the structural object. In various embodiments, the transfer medium is configured to operate at a temperature difference of about, or less than about, 15° C., 10° C., or 5° C. Air movement may be added as a way to assist the speed of the thermal dynamic transfer. The bidirectional thermal energy-transfer system does not need to be configured with low temperature differences, i.e., temperature differences higher than 20° C. between the energy-transfer medium and the structural object may be employed.

The thermally conductive concrete may be characterized by a bulk average thermal conductivity of at least 1.2 W/m·K, 1.5 W/m·K, 2.0 W/m·K, 2.5 W/m·K, or 3.0 W/m·K, in various embodiments. The thermally conductive concrete is preferably characterized by a bulk average thermal conductivity of about 2 W/m·K or more. Typically, the surface average thermal conductivity of the thermally conductive concrete is the same, or about the same, as the bulk average thermal conductivity. However, they may be different; in some embodiments, the thermally conductive concrete may be characterized by a surface average thermal conductivity of at least 1.2 W/m·K, 1.5 W/m·K, 2.0 W/m·K, 2.5 W/m·K, or 3.0 W/m·K. The surface average thermal conductivity may be higher or lower than the bulk average thermal conductivity.

The thermally conductive concrete may be characterized by a compressive strength of about 1000 psi, 1500 psi, 2000 psi, 2500 psi, 3000 psi, 3500 psi, 4000 psi, 4500 psi, 5000 psi, or more. The compressive strength may be measured using ASTM C39, for example.

The thermally conductive concrete may be characterized by a flexural strength of about 100 psi, 200 psi, 300 psi, 400 psi, 500 psi, 600 psi, 700 psi, 800 psi, 900 psi, 1000 psi, or more. The flexural strength may be measured using ASTM C78, for example. Compared to conventional concrete, it has been found that compositions described herein can be at least 30% stronger in compression than a standard concrete sample, despite about 25% lower volume, in some embodiments.

Various object thicknesses are possible for the bidirectional thermal energy-transfer system. For example, when used in lightweight indoor radiant floor applications, a typical thickness is from 1.25 to 4 inches. Commercial and military runway applications would be much thicker, such as 9-inch-thick slabs in general aviation to 24-inch-thick slabs in commercial aviation. In various embodiments, the bidirectional thermal energy-transfer system has a thickness or depth dimension from about 1 inch or less to about 5 feet or more.

In some embodiments, the thermally conductive concrete contains less than 1 vol % entrained air, as discussed further below.

The bidirectional thermal energy-transfer system may have improved strength-to-weight ratios, heat-island effect, hardness, time to cure, freeze-thaw characteristics, structural longevity, moisture and salt migration, thermal heating, and/or solar hot fluid production, compared to a concrete material that does not contain the thermally conductive concrete composition and/or the means of transferring thermal energy.

The bidirectional thermal energy-transfer system may be present in a solar-energy collection system, a grade beam, an indoor radiant flooring system, a structural wall or ceiling, a bridge, a roadway, a driveway, a parking lot, a commercial aviation runway, a military aviation runway, a grain silo or other grain container, or one or more pavers, for example.

In some variations, the system utilizes capillary action, mimicking nature, and can be deployed in neural networking and cognitive learning systems. The system may be configured in a neural network of energy transfer to move energy from high potential to low potential as needed, using only the laws of physics (uncontrolled mode). In some embodiments, the system may be configured in a neural network of energy transfer to move energy from high potential to low potential as called upon by a controller programmed for specific results (controlled mode).

The bidirectional thermal energy-transfer system may be present as a node in a neural network. As intended herein, a "node" is a point at which energy-transfer pathways intersect or branch. The neural network includes a plurality of bidirectional thermal energy-transfer systems, or sub-systems or elements thereof, that form a plurality of nodes. The nodes are thermally interconnected to form the neural network. The number of nodes may vary widely, such as from 2 to about 5, 10, 20, 50, 100, 200, 500, or more.

A given node in a neural network may simultaneously accept heat and reject heat, when the node is a bidirectional thermal energy-transfer system. For example, a thermally conductive concrete may accept heat by solar radiation while simultaneously rejecting heat to a heat-transfer medium. In the overall neural network, one or more nodes may be heating while one or more nodes may be cooling, simultaneously. Because all of the nodes are interconnected, there may be a complex, dynamic distribution of thermal energy throughout the network. Some nodes may be temporarily inactive (e.g., to due a transient balancing of heat transfer in and out), even while other nodes are heating or cooling.

The physical size of the neural network may also vary widely. Many embodiments of bidirectional thermal energy-transfer systems are depicted in FIGS. 1-10, noting that any one of these systems may be part of a larger system that includes the neural network. The neural network may be a plurality of any one of the structures in FIGS. 1 to 10, a combination of such structures, and/or other infrastructure. In principle, the neural network may include entire developments or even whole cities.

For example, a neural network may include a plurality of buildings in thermal communication, via interconnectivity of nodes. In this case, the buildings can thermally communicate with each other to potentially provide passive control, e.g. in an automatically thermally controlled network or infrastructure zone. That is, in some embodiments with passive control, no computer or electrical control is necessary. For example, thermal expansion valves or other mechanical open/close valves may be employed, along with copper tubing containing a liquid refrigerant, to automatically control the flow of thermal energy between nodes of the neural network.

In some embodiments, the neural network also includes one or more computers, control boards, sensors, transmitters, antennas, and/or other elements. Depending on the specific functions, these elements may or may not be classified as network nodes, and/or they may assist in forming node-interconnects. Generally speaking, the overall network is optionally computer-controlled, and may be automated, using well-known control principles. When the network is not computer-controlled but is configured with passive control as described above, data output from the system may be utilized within the system itself (such as at another zone within the neural network) or at other, similar installations.

Some variations employ deep learning technologies in a cognitive learning system. The neural-network ability of the interconnected nodes allows the bidirectional thermal energy-transfer system to interact with fuzzy logic used in some software involved with engineering grade beams, for example. In some embodiments, the bidirectional thermal energy-transfer system provides feedback in the form of inferential statistics. For example, Bayesian methods can be applied to help engineers with the thermal recognition of curing.

The bidirectional thermal energy-transfer system can be part of a predictive modeling system, a cognitive learning system, and/or an Internet of Things (IoT) system. A stacked hierarchy can be predictive, based on IoT metadata. In particular, weather data can be combined with real-time results that engineers observe from feedback. This feedback loop can be part of a feedback loop control system (FBLC).

Note that the cognitive learning system is not artificial intelligence or machine learning; rather, it is a tiered and connected system. This system has many tiers (N−1, N−2, N−(n+1), etc.). This system is adaptive; it can modify itself based on learned weighted importance. Its training is enhanced by its own previous tier. Each tier is part of the thermal recognition which translates into rapid response on the FBLC.

Some variations of the invention provide a thermally conductive concrete composition, the composition comprising carbon, one or more metals and/or conductive polymers, aggregate, cement, and optionally water, wherein the carbon is present in the composition at a concentration from about 5 vol % to about 35 vol % on a dry basis, and wherein the one or more metals and/or conductive polymers are present in the composition at a concentration from about 0.5 vol % to about 10 vol % on a dry basis.

In some embodiments, the carbon is present in the composition at a concentration from about 10 vol % to about 25 vol % on a dry basis. In various embodiments, the carbon is present in the composition at a concentration of about 1, 5, 10, 15, 20, 25, 30, 35, 40, 45, or 50 vol %. Lower or higher carbon concentrations are possible in certain embodiments.

In these or other embodiments, the one or more metals and/or conductive polymers are present in the composition at a concentration from about 1 vol % to about 5 vol % on a dry basis. In various embodiments, the one or more metals and/or conductive polymers are present in the composition at a concentration of about 0.1, 0.5, 1, 2, 3, 4, 5, 10, 15, or 20 vol %. Lower or higher metal and/or polymer concentrations are possible in certain embodiments.

In some embodiments, the carbon is selected from the group consisting of graphite, graphene, carbon fibers, carbon nanostructures, coal waste, activated carbon, coke, pitch coke, petroleum coke, charcoal, biochar, and combinations or derivatives thereof.

When graphite is present, the graphite may include one or more of amorphous graphite, crystalline flake graphite, expandable graphite, purified flake graphite, vein graphite, synthetic graphite, or petroleum coke.

In certain embodiments, the carbon is contained in, or derived from, coal waste and the one or more metals contain, or are derived from, metal waste. In certain embodiments, the carbon consists of graphite and the one or more metals and/or conductive polymers consist of steel fibers.

The one or more metals and/or conductive polymers may include metals selected from the group consisting of iron, magnesium, manganese, zinc, aluminum, cadmium, lead, tin, nickel, copper, steel, stainless steel, brass, bronze, and combinations thereof. The metals may be in various forms, such as metal powder (particles), metal fibers, metal rods, metal bars, metal layers, and so on.

The one or more metals and/or conductive polymers may include conductive polymers, which are organic polymers that conduct electricity. Such compounds may have metallic conductivity or can be semiconductors. In various embodiments, the conductive polymers are selected from the group consisting of polyacetylene, polypyrroles, polythiophenes, polyanilines, polyfluorenes, polyphenylenes, polyphenylene sulfides, polypyrenes, polyazulenes, polynaphthalenes, polycarbazoles, polyindoles, polyazepines, polyanilines, and combinations thereof. The conductive polymers may be in various forms, such as powder (particles), fibers, rods, needles (high aspect ratios), layers, and so on.

In some embodiments, zeolites are also present in the thermally conductive concrete composition. Zeolites may include one or more minerals consisting of hydrated aluminosilicates of sodium, potassium, calcium, and/or barium.

In its simplest form, concrete is a mixture of paste (cement and water) and aggregate. The paste coats the surface of the fine (small) and coarse (larger) aggregates. Through a chemical reaction called hydration, the paste hardens and gains strength to form the rock-like mass known as concrete. In this specification, "concrete" should be construed to include mixtures of cement and aggregate with other materials, such as asphalt (in a composite material or a layered configuration, for example).

Aggregate typically forms a significant portion of the concrete composition, for economic as well as strength reasons. The aggregate may be from about 50 vol % to about 90 vol % of the thermally conductive concrete composition, for example. The aggregate may include fine aggregate, coarse aggregate, or a mixture thereof. For example, the aggregate may include from 25% to 75% coarse particles (e.g., rocks) and 75% to 25% fine particles (e.g, sand). Coarse aggregates are any particles greater than 0.19 inch, but generally range between 0.375 and 1.5 inches in diameter. Gravels constitute the majority of coarse aggregate used in concrete. Crushed stone is another option for the coarse aggregate. Fine aggregates typically consist of natural sand or crushed stone, with most particles passing through a 0.375-inch sieve. Waste silica (e.g., ground recycled glass) is another option for fine aggregate.

The cement may be from about 5 vol % to about 25 vol % of the thermally conductive concrete composition, for example. Various types of cement may be employed, such as (but not limited to) rapid-hardening cement, quick-setting cement, low-heat cement, sulfate-resisting cement, blast-furnace slag cement, high-alumina cement, white cement, colored cement, pozzolanic cement, air-entraining cement, and hydrographic cement. In certain embodiments, cement is Portland Cement, which may encompass any of the above cement characteristics. Portland Cement is produced by heating sources of lime, iron, silica, and alumina to clinkering temperature (~1500° C.) in a rotating kiln, then grinding the clinker to a fine powder.

The thermally conductive concrete composition may or may not include water. For example, the thermally conductive concrete composition may initially be provided in dry-powder form, with little or no water present. During concrete curing, water will be present. After curing, water is not necessarily present although depending on environmental conditions (e.g., humidity levels) there will usually be water present in the final thermally conductive concrete composition. In various embodiments, on a wet basis, the thermally conductive concrete composition includes from about 0 vol % to about 50 vol % water, such as from about 10 vol % to about 30 vol % water, or about 1 vol % to about 10 vol %.

Optionally, one or more admixtures may be added to the thermally conductive concrete composition to increase workability, reduce the required amount of water, mitigate harmful chemical reactions, change the color or texture, and/or for other beneficial purposes.

In preferred embodiments, the thermally conductive concrete composition has a homogeneous (uniform) particle distribution, so that an arbitrary region of material has the same composition as another arbitrary region of material.

In some embodiments, the thermally conductive concrete composition is present in cured form, which may be a surface, object, or other region of concrete.

The thermally conductive concrete composition preferably contains less than 4 vol % entrained air, such as less than 3 vol %, 2 vol %, or 1 vol % air. The carbon phase preferably displaces some or all of the regions of space normally occupied by entrained air. Small, entrapped air voids may still be present, to allow space for ice formation in cold climates. The presence of the thermally conductive, shock-absorbing material (e.g., carbonaceous material) may inhibit or prevent the penetration of water in the first place, so that ice formation is not an issue, or less of a concern. Without being limited by speculation, even if there is ice formation, the shock-absorbing material is able to deform locally so that stresses caused by water expansion (forming ice) do not substantially propagate into the other concrete phases.

If there is a need for a particular application to include a higher capacity for entrained air (e.g., to allow space for ice formation), that can be accomplished by including chemical admixtures called air entrainers, for example. Air entrainers may be added to the concrete, either by dissolving them in the mix water or by mixing them in powder form with the initial composition. Air entrainers are essentially surfactants, which encourage the formation of a stable foam of small air bubbles during mixing of the fresh concrete.

The thermally conductive concrete composition, in certain embodiments, consists essentially of carbon, one or more metals, aggregate, cement, water, and entrained air.

In some embodiments, the carbon is characterized by an average carbon-particle size from about 1 micron to about 1 millimeter, such as from about 10 microns to about 200 microns.

In some embodiments, the thermally conductive concrete is characterized by a bulk average thermal conductivity of about 2 W/m. K or more.

In some embodiments, the thermally conductive concrete is characterized by a compressive strength of about 2500 psi or more.

The thermally conductive concrete may be present—with or without embedded pipes or tubes—in a solar-energy collection system, a grade beam, an indoor radiant flooring system, a structural wall or ceiling, a bridge, a roadway, a driveway, a parking lot, a commercial aviation runway, a military aviation runway, a grain silo or other grain container, pavers or paver systems, or concrete furniture, for example.

In a specific embodiment pertaining to pavers, the means of transferring thermal energy (e.g., embedded pipes) may be placed in a thermally conductive concrete layer disposed under the paver, for example. In these or other embodiments, the means of transferring thermal energy (e.g., embedded pipes) may be placed in a sand bed layer below the paver, or below a concrete layer that is itself below a paver. In certain embodiments, the pavers may be configured with embedded electrical antennas, with or without embedded tubes or pipes under the paver.

The thermally conductive concrete composition may be disposed in thermal communication with a thermal energy-transfer medium, as discussed above (bidirectional thermal energy-transfer systems).

In other embodiments, the thermally conductive concrete composition is alternatively or additionally electrically conductive. In these embodiments, the electrically conductive concrete composition may be disposed in electrical communication with an electricity-conducting network. "Electrical communication" means that the electrically conductive concrete composition is capable of conducting or transmitting electricity or electromagnetic waves to and/or from an electricity-conducting network (e.g., a network that is connected to a local or regional power supply or grid).

Acting as an integrated antenna without a ground plane, electromagnetic waves may be radiated into the electrically conductive concrete composition, allowing energy to be built-up and stored like a capacitor and then used as a power source. Electromagnetic waves may also be radiated out of the electrically conductive concrete composition, allowing electrical energy (or electrical energy potential) to be transmitted wirelessly. Even when not utilizing the composition in electrical power applications, the electromagnetic benefit may be useful to boost the creation of thermal energy.

The electricity generation can be at the location of electrical energy supply or demand, or it can be at the structural object itself, such as when it is desired to provide electrical energy into the concrete structural object containing the electrically conductive concrete. In some embodiments, the location of electrical energy supply or demand is a first structural object containing electrically conductive concrete, and electrical energy is transferred (in either direction) between the first structural object and a second structural object that also contains electrically conductive concrete.

In some embodiments, bidirectional electrical energy transfer can be achieved simultaneously, i.e. electricity is being transferred both ways at the same time. Also, in some embodiments, simultaneous bidirectional energy transfer is achieved with thermal energy in one direction and electrical energy flowing in another direction. For example, an electrically conductive concrete may accept heat by solar radiation, inductive heating, or other electromagnetic waves while simultaneously providing electrical energy through a conductive material (e.g., metal wires) or wirelessly.

The electrically conductive concrete preferably includes an electrically conductive, shock-absorbing material, such as a carbonaceous material. In some embodiments, the carbonaceous material is graphite.

In certain embodiments, the primary ingredients of the electrically conductive concrete are water, sand, aggregate, coal waste, metal waste, and Portland cement. These elements are combined in specific ratios depending on the energy and structural requirements of any particular application.

In some embodiments of the bidirectional electrical energy-transfer system, the electrically conductive concrete comprises carbon, one or more metals and/or conductive polymers, aggregate, cement, and optionally water, wherein the carbon is present in the composition at a concentration from about 5 vol % to about 35 vol % on a dry basis, and wherein the one or more metals and/or conductive polymers are present in the composition at a concentration from about 0.5 vol % to about 10 vol % on a dry basis.

The means of transferring electrical energy between the structural object and the location of electrical energy supply or demand may include a matrix of wires, metal mesh, or other conductive network. In some embodiments, there is also present, in the bidirectional energy-transfer system, one or more pipes, tubes, capillaries, manifolding, or other containment regions, wherein the pipes, tubes, or other containment regions contain a thermal energy-transfer medium. The thermal energy-transfer medium may be water, for example, providing efficient hydronic control. In some embodiments, the thermal energy-transfer medium is a mixture of water and non-aqueous liquid, such as an anti-freeze solution. In some embodiments, the thermal energy-transfer medium is a liquid, non-aqueous heat-transfer fluid. In certain embodiments, the thermal energy-transfer medium is a solid heat-transfer material, such as a metal, a salt, a conductive gel, or an ionic polymer. Note that in the case of solid heat-transfer materials, the heat-transfer materials may be self-contained (e.g., metal wires) within the electrically conductive concrete. The solid heat-transfer materials may also be electrically conductive, which may have a particular benefit for bidirectional energy transfer involving both thermal and electrical energy transfer (whether simultaneous or not).

For example, energy arriving at a surface (e.g., impacting the surface from solar radiation, rising up from the ground below, etc.) may be collected or harvested, and then conveyed to another place for use, as thermal and/or electrical energy. The energy conveyance may be accomplished via a series of embedded conductors within the bidirectional energy-transfer system, or otherwise in physical contact with the bidirectional energy-transfer system, for example. The surfaces may be sidewalks, driveways, patios, pool decks, elevated platforms, roofs (e.g. concrete shingles or roof tiles), roadways, runways, and so on.

Some variations of the invention provide bidirectional electrical energy-transfer systems comprising:

an electrically conductive concrete, in cured form and disposed in a structural object;

a location of electrical energy supply or demand, wherein the location of electrical energy supply or demand is physically isolated from, but in electrical communication with, the electrically conductive concrete; and a means of transferring electrical energy between the structural object and the location of electrical energy supply or demand.

The electrically conductive concrete may include an electrically conductive, shock-absorbing material, such as a carbonaceous material (e.g., graphite). The electrically conductive concrete may comprise carbon, one or more metals and/or conductive polymers, aggregate, cement, and optionally water, wherein the carbon is present in the composition at a concentration from about 5 vol % to about 35 vol % on a dry basis, and wherein the one or more metals and/or conductive polymers are present in the composition at a concentration from about 0.5 vol % to about 10 vol % on a dry basis. Preferably the composition contains less than 1 vol % entrained air. The electrically conductive concrete may be characterized by a compressive strength of about 2500 psi or more, such as 4000 psi or more.

The means of transferring electrical energy between the structural object and the location of energy supply or demand may be selected from the group consisting of metal wiring, metal mesh, metal layers, a continuous conductive network, and combinations thereof.

The electrically conductive concrete functions as an integrated antenna without a ground plane. The electrically conductive concrete is capable of wirelessly receiving electricity via electromagnetic fields. The electrically conductive concrete is capable of capacitively storing electricity when exposed to electromagnetic radiation.

The system optionally contains a photovoltaic material for converting incoming light into electricity.

In some embodiments, the system further comprises a plurality of embedded conductors selected from the group consisting of metal wiring, metal mesh, metal layers, a continuous conductive network, and combinations thereof.

The system may be present in a solar-energy collection system. The system may be present in a bridge, roadway, driveway, parking lot, commercial aviation runway, or military aviation runway.

Optionally, the electrically conductive concrete is capable of wirelessly transmitting electricity via electromagnetic fields.

The bidirectional electrical energy-transfer system may be present in a solar-energy collection system, a grade beam, an indoor radiant flooring system, a structural wall or ceiling, a bridge, a roadway, a driveway, a parking lot, a commercial aviation runway, a military aviation runway, a grain silo or other grain container, or one or more pavers, for example.

In some variations, the system can be deployed in neural networking and cognitive learning systems. The system may be configured in a neural network of electrical energy transfer to move electricity as needed, using only the laws of physics (uncontrolled mode). In some embodiments, the bidirectional electrical energy-transfer system may be configured in a neural network of electrical energy transfer to move electricity as called upon by a controller programmed for specific results (controlled mode).

The bidirectional electrical energy-transfer system may be present as a node in a neural network. Again, a node is a point at which electrical energy-transfer pathways intersect or branch. The neural network includes a plurality of bidirectional electrical (and/or thermal) energy-transfer systems, or sub-systems or elements thereof, that form a plurality of nodes. The nodes are electrically interconnected to form the neural network. The number of nodes may vary widely, such as from 2 to about 5, 10, 20, 50, 100, 200, 500, or more.

A given node in a neural network may simultaneously accept electricity and transmit electricity, when the node is a bidirectional electrical energy-transfer system. In the overall neural network, one or more nodes may be providing electricity while one or more nodes may be accepting electricity, simultaneously. Because all of the nodes are interconnected, there may be a complex, dynamic distribution of electricity and electromagnetic waves throughout the network. Some nodes may be temporarily inactive (e.g., due transient resistivity), even while other nodes are electrically active.

The physical size of the neural network (for bidirectional electrical energy transfer) may also vary widely. In principle, the electrical-energy neural network may include entire developments, whole cities, or even larger infrastructure.

For example, a neural network may include a plurality of buildings in electrical communication, via interconnectivity of nodes. In this case, the buildings can electrically communicate with each other to potentially provide passive control, e.g. in an automatically controlled electrical network or infrastructure zone. That is, in some embodiments with passive control, no computer control is necessary.

In some embodiments, the neural network also includes one or more computers, control boards, sensors, transmitters, antennas, magnets, induction sources, and/or other elements. Depending on the specific functions, these elements may or may not be classified as network nodes, and/or they may assist in forming node-interconnects. Generally speaking, the overall network is optionally computer-controlled, and may be automated, using well-known control principles. When the network is not computer-controlled but is configured with passive control, data output from the system may be utilized within the system itself (such as at another zone within the neural network) or at other, similar installations.

This invention therefore provides a bidirectional, simultaneous energy-transfer system wherein the system is suitable for thermal energy transfer (i.e. heating and cooling), electrical energy transfer, or a combination thereof.

While this specification focuses on concrete compositions and structures, it should be noted that the concepts, compositions, systems, networks, and methods may be applied to other surfaces (e.g., pavements) and structures (e.g., structural beams and walls) that do not necessarily include concrete. Other materials for thermally and/or electrically conductive pavements or structural objects may include, but are not limited to, asphalt, natural or synthetic polymers, natural or synthetic ceramics, compacted natural materials, and so on.

For example, some variations provide a bidirectional thermal and/or electrical energy-transfer system comprising:

a thermally and/or electrically conductive pavement or structural object, in cured form;

a location of energy supply or demand that is physically isolated from, but in thermodynamic and/or electromagnetic communication with, the thermally and/or electrically conductive pavement or structural object; and a means of transferring thermal and/or electrical energy between the thermally and/or electrically conductive pavement or structural object and the location of energy supply or demand, for heating, cooling, electricity, or a combination thereof.

EXAMPLES

The following non-limiting examples demonstrate the principles of this invention, in various embodiments. Note that any of these exemplary systems may be combined with tanks or other features described in U.S. Pat. No. 9,702,631, issued Jul. 11, 2017, which is hereby incorporated by reference herein.

While these examples are directed to thermal energy transfer, one skilled in the art will recognize that many of these examples may be modified to provide electrical energy transfer (as disclosed in the specification above). For example, the thermal energy-transfer means may be replaced with electrical energy-transfer means, and an electrically conductive concrete composition (which may or may not also be thermally conductive) may be utilized.

Also note that where features (e.g., embedded tubes) are shown in the drawings, the size of the features, the number of the features present, and the orientation of features in the structure can vary from the depicted illustration. These drawings are not to scale.

Example 1: Grade Beams

In much of the world, expansive soils have led to the ruin of vertical and horizontal structures. In regions of North America, commercial, institutional, and residential buildings require a significant amount of geotechnical, civil, and structural engineering to combat the forces of expanding soils on a building site. The solution often chosen to prevent poured floors from cracking or buckling is to place grade beams of a certain size and strength in the ground.

The thermally conductive concrete composition may be used in a grade beam application. The design mix can be held at the optimal temperature to ensure the exothermic reaction of the concrete occurs at the proper temperature but does not exceed that temperature, because exceeding that temperature can cause undesirable effects on the strength of the grade beam. The system may be configured to ensure the proper cure temperature while significantly reducing the overall cure time. After the grade beam has gained its best possible strength from the design mix, its entire cure cycle can be part of the monitored and recorded record of construction.

FIG. 1 shows an exemplary embodiment of a grade beam 100. The grade beam 100 includes a plurality of embedded tubes 101, for transferring thermal energy, disposed in a thermally conductive concrete 102. The orientation of embedded tubes 101 may vary. Optionally, the grade beam 100 is prestressed.

The grade beam 100 is able to exchange energy with its native surroundings (i.e., a location of energy supply or demand), either accepting or rejecting energy. The grade beam may be a node in a neural network. The grade beam 100 has transitioned from being part of the feedback loop control system to an integral part of an enhanced thermal management system. The temperature profile delivered from the hydronic tubing 101 embedded in the grade beam 100 and surrounded by the thermally conductive concrete composition 102 gives construction personnel the opportunity to do something previously not available to them—to control the thermal dynamics of the cure.

Example 2: Ceiling Chilled Beams

Chilled beams are dependent on air movement to transfer heat. Chilled beams are solely convective units. Active chilled beams combine room air and ventilation air to meet capacity. Passive chilled beams condition the air in the space only. Chilled beams can be used for heating and/or cooling the space, and provide high thermal comfort and energy efficiency.

A chilled beam made with the thermally conductive concrete composition removes heat more quickly than beams made from conventional concrete. Chilled beams may be at least 50% more effective at removing heat from a conditioned space. The chilled beam uses lower delta-T and that means they are effective at a greater temperature of entering heat-transfer fluid (e.g., water). This means it takes less energy to reject BTUs using this chilled beam, compared to a standard beam. Energy efficiency is improved, as is response time (faster).

Figure 2:
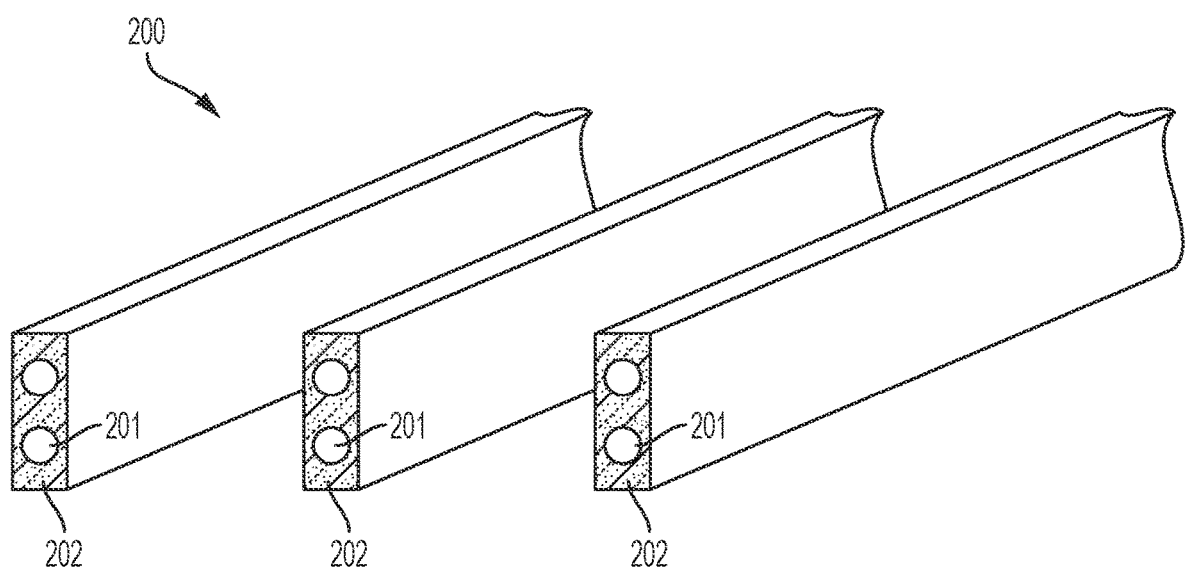
FIG. 2 shows an exemplary embodiment of ceiling chilled beams, in some embodiments of the invention.

FIG. 2 shows an exemplary embodiment of ceiling chilled beams 200. Three ceiling chilled beams 200 are depicted, for illustration only. A ceiling chilled beam 200 includes a plurality of embedded tubes 201, for transferring thermal energy, disposed in a thermally conductive concrete 202. The orientation of embedded tubes 201 may vary. The spacing between individual beams 200 can vary widely, such as from 1 feet to 20 feet apart.

Example 3: Concrete Replacement

There are many systems that utilize concrete. The thermally conductive concrete composition may be used in place of some or all of conventional concrete in any of these systems. Specific examples include heated driveways, temporary roads, bridges, garden terraces over parking structures, vertical walls, and ceilings.

Various benefits that can result may include one or more of the following:

1. The system reduces or eliminates the large amount of washed gravel normally associated with soil stability.

3. This system reduces or eliminates the large amount of steel reinforcement (rebar and mesh) normally associated with this type of work.

2. This system reduces or eliminates a large amount of concrete.

4. This system, when used as an underlayment for traditional concrete roads, flooring or bridges, reduces or eliminates the transmission of cracks into the topping surfaces from subsurface stresses.

5. The reduction of tons of material having to be processed and brought to the construction site reduces road pollution, job site congestion, job site noise, and pollution.

6. This system installs very quickly, such as with a single truck and trailer set-up.

7. This product can be shipped as blocks or manufactured on-site, earning points and/or credits for LEED, Green Credits, or other recognition for environmental performance and sustainable design.

8. The added insulation helps make the system more efficient (uses less energy, thereby generating less pollution) and is more effective (heats faster).

9. This system may be used as primarily a solar collection system. In the Rocky Mountains, the system may be used as a snowmelt system 37 to 65 days per year, for example. For the other days, the system may be used to collect and distribute solar energy to the geothermal heat exchanger which feeds domestic hot water, a pool/spa, radiant floors, etc.

10. An optional waterproof membrane on the top layer serves as the drainage plane and allows for the use of pervious or non-pervious paver stones above.

11. The high thermal conductivity is a bidirectional component of the neural network for energy. This not only helps move the energy collected from the sun and electromagnetic radiation into the tubing and along the surface, it also accelerates the heat transfer from the tubing system back into the topping layer to melt snow more quickly, or provide faster radiant heating, for example.

12. The bidirectional nature of the system allows indoor uses, including radiant-heated and radiant-cooled floors, walls and ceilings.

Figure 3:
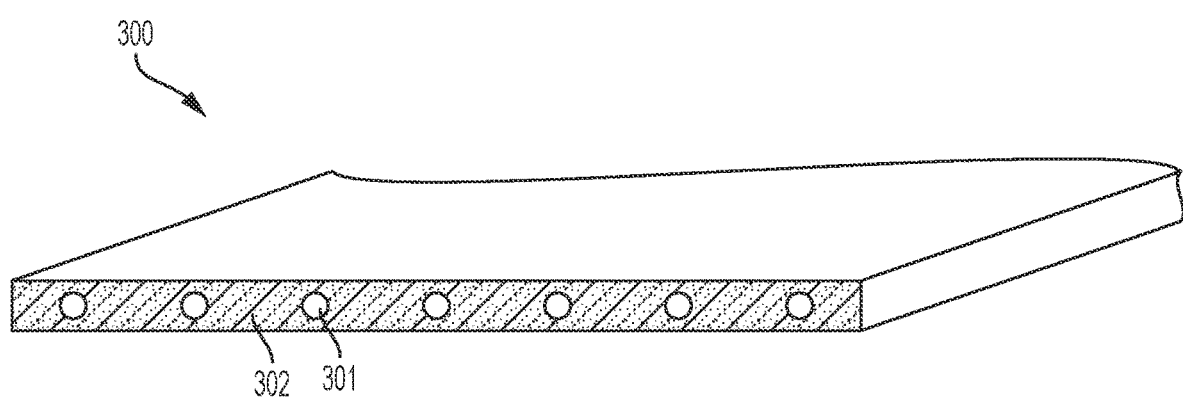
FIG. 3 shows an exemplary embodiment of a cementitious poured ceiling, in some embodiments of the invention.

FIG. 3 shows an exemplary embodiment of a cementitious poured ceiling 300. The cementitious poured ceiling 300 includes a plurality of embedded tubes 301, for transferring thermal energy, disposed in a thermally conductive concrete 302. The orientation of embedded tubes 301 may vary.

Figure 4:
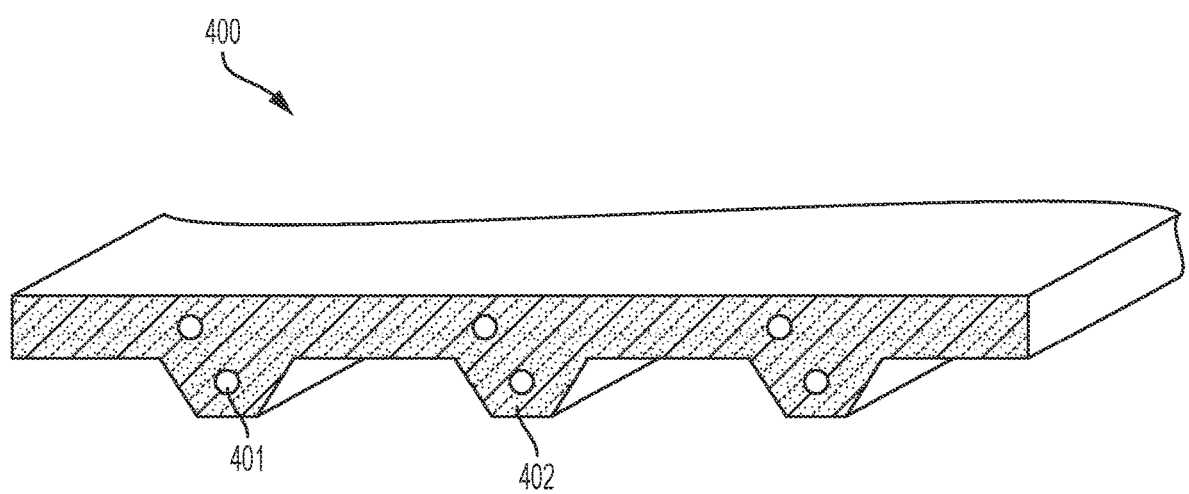
FIG. 4 shows an exemplary embodiment of a deck pan ceiling, in some embodiments of the invention.

FIG. 4 shows an exemplary embodiment of a deck pan ceiling 400. The deck pan ceiling 400 includes a plurality of embedded tubes 401, for transferring thermal energy, disposed in a thermally conductive concrete 402. The orientation of embedded tubes 401 may vary.

Figure 5:
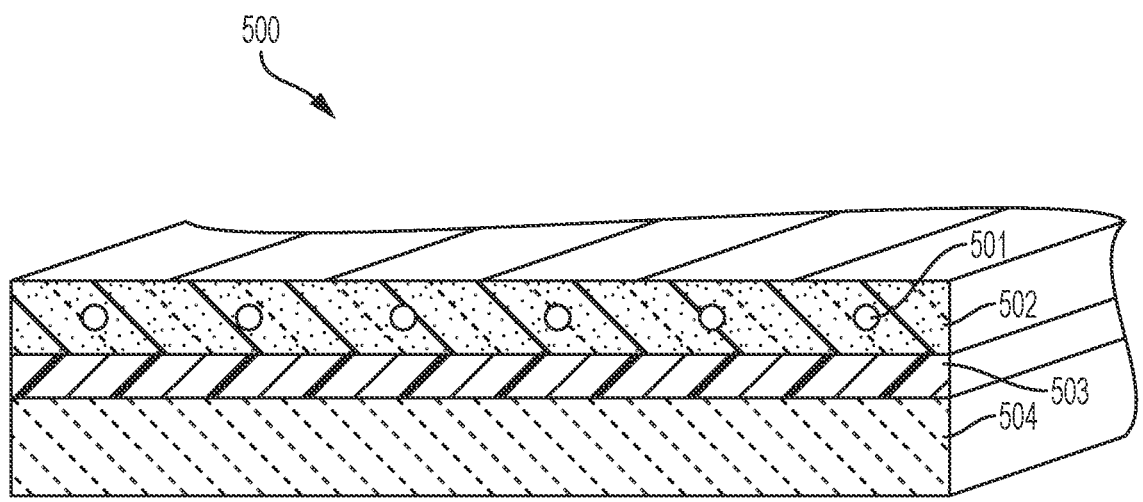
FIG. 5 shows an exemplary embodiment of a topping slab in combination with a structural slab, in some embodiments of the invention.

FIG. 5 shows an exemplary embodiment of a topping slab in combination with a structural slab, forming a structure 500. The structure 500 includes a plurality of embedded tubes 501, for transferring thermal energy, disposed in a thermally conductive concrete 502. The 501/502 layer is disposed in communication with an insulation layer 503, which is disposed in communication with a structural slab 504. The orientation of embedded tubes 501 may vary. The insulation layer 503 and structural slab 504 may utilize conventional materials. The structural slab 504 may be suitable prepared (e.g., compacted and leveled) ground, in some embodiments.

Example 4: Energy-Efficient Buildings and Houses

In passive house or net-zero-design buildings and houses, energy can be harvested in one area and moved to another area with the use of a small pump, without the need to turn on HVAC equipment such as air conditioners or boilers. For example, sun rising in the east warms a sun room or trombe wall. This trombe wall by itself relies on thermal convection to transfer heat or equalize heat in a near room. The wall may have some radiation within the near room penetrating about 60 inches in the horizontal. While this is useful as the mean radiant temperature (MRT) on humans that are within this range, the MRT is profoundly expanded with the use of the present neural network energy system.

For example, the northwest room, when calling for heat, does not need to fire up a mechanical device such as a fuel gas, liquid fuel, or electric element to heat the far room. The neural network will take the heat from the trombe wall and direct it to the location most needed, in this example the northwest room. If the rooms are all satisfied, the thermal energy captured by the neural network can decide to send it to a storage tank, for example. It now becomes part of the energy system that heats domestic hot water, goes to snowmelt, or is simply stored until later when another room in the building is asking for heat.

Now, reverse the entire scenario. The same process of energy transfer can be achieved in reverse when the thermally conductive concrete composition is in the walls, floors, or ceilings.

Example 5: Low-Noise Concrete Structures and Surfaces

Without being limited by theory, the thermally conductive concrete composition is suitable for absorption and distribution of sound transmission. Sound waves are energy. The thermally conductive concrete composition is an energy-distribution material. The way it distributes the energy from sound waves is different than distribution of heat or electrical energy through conduction. The particle size and distribution pattern should absorb the frequency from sound and dampen it, without causing a concentrated hot spot. This is important not only in roads, but in internal buildings for noise reduction. Also, the thermally conductive concrete composition may be effective against electromagnetic pulses in military applications.

Figure 6:
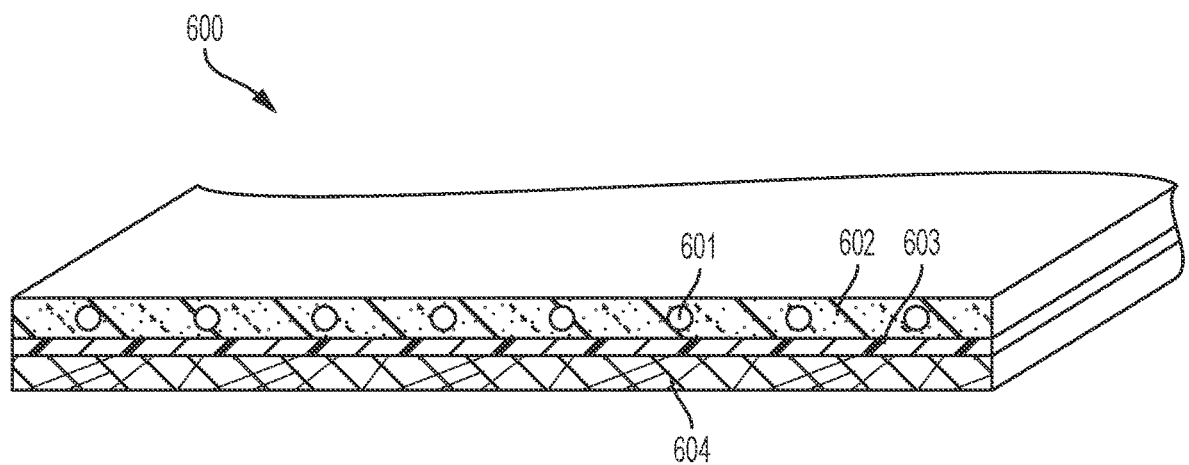
FIG. 6 shows an exemplary embodiment of a low-noise structure, in some embodiments of the invention.

FIG. 6 shows an exemplary embodiment of a low-noise structure 600. The structure 600 includes a plurality of embedded tubes 601, for transferring thermal energy, disposed in a thermally conductive concrete 602. The 601/602 layer is disposed in communication with a sound-insulation layer 603, which is disposed in communication with a sub-floor 604. The orientation of embedded tubes 601 may vary. The sound-insulation layer 603 may also be thermally insulative, and may utilize conventional materials. The sub-floor 604 may be wood, concrete, or prepared ground, for example.

Example 6: Grain Silos

Grain silos use a significant amount of energy to keep grain cool-preferably at a temperature of about 5-10° C., but not freezing. One of the challenges to keeping grains at this temperature is that it is not desirable to introduce moisture from condensation into the feedstock. Moisture can cause the grains to rot, sprout, or combust. It takes a tremendous amount of energy to prevent undesirable effects from happening within the grain silo or other storage bins. To combat the negative effects, large fans blow ambient air into the silo to help circulate the air inside and cool the grains. The fans introduce moist humid air from the ambient surroundings and have to be run even longer in order to eliminate the additional moisture they introduce. Often grain from one silo must be moved to another silo to eliminate the rot occurring, in an effort to salvage the good grain. This exercise requires a lot of effort in labor and energy, not only in labor hours but in utility expenses to pay for the pump and fan and other motorized energy consumption. As moisture from the products ingress in a concrete silo, the concrete can experience freeze-thaw cycles that degrade the silo's structural integrity.

Figure 7:
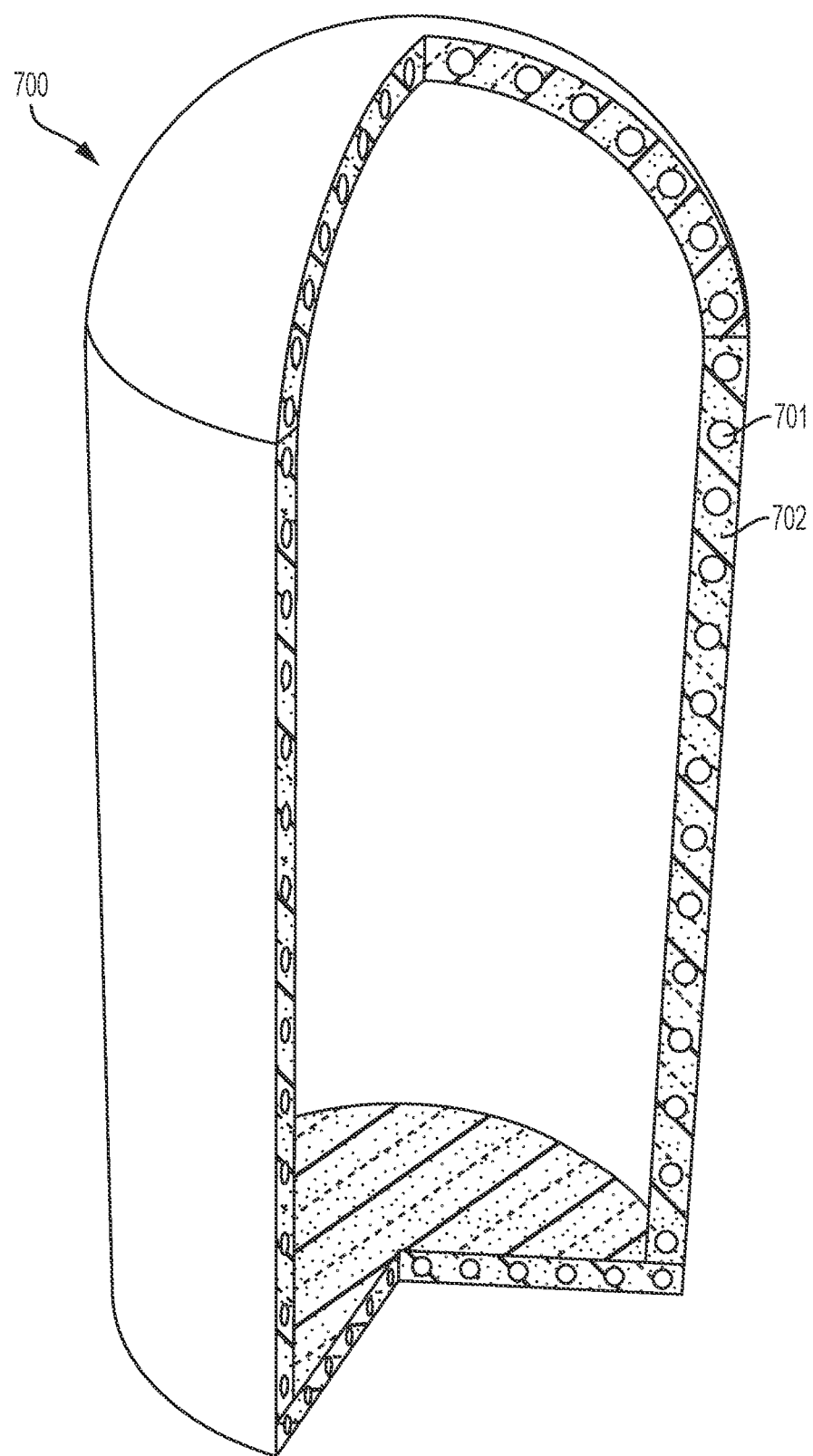
FIG. 7 shows an exemplary embodiment of a grain silo, in some embodiments of the invention.

FIG. 7 shows an exemplary embodiment of a grain silo 700. The walls of the grain silo 700 include a plurality of embedded tubes 701, for transferring thermal energy, disposed in a thermally conductive concrete 702. The top (roof) as well as the bottom (floor) of the grain silo 700 also includes a plurality of embedded thermal-transfer tubes 701 disposed in a thermally conductive concrete 702. The orientation of embedded tubes 701 may vary.

When the thermally conductive concrete composition is utilized in a concrete silo, fan energy is reduced to keep grains at the proper temperature (not too hot and not too cold) without introducing moisture.

Example 7: Concrete Foundations

Figure 8:
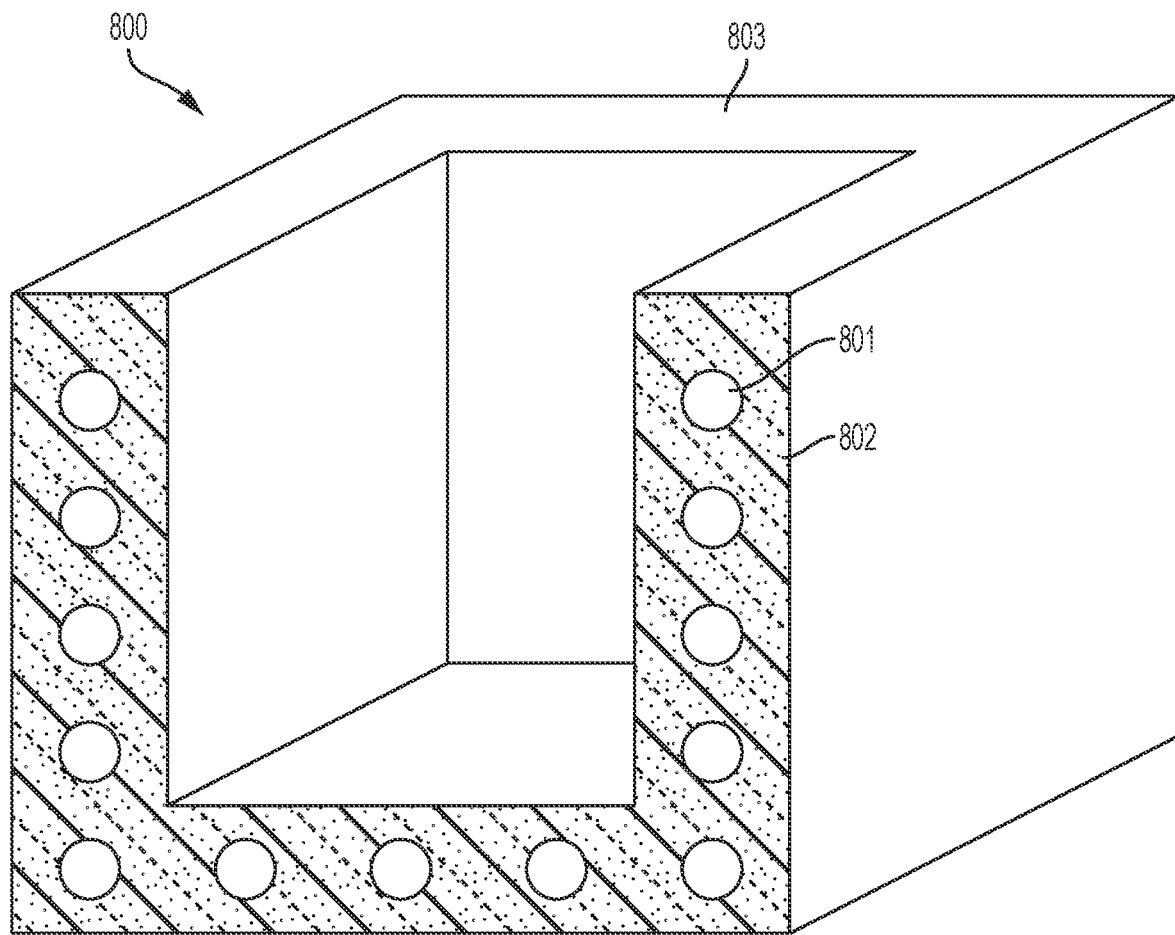
FIG. 8 shows an exemplary embodiment of a foundation for a house, building, or other structure, in some embodiments of the invention.

FIG. 8 shows an exemplary embodiment of a foundation 800 for a house, building, or other structure. The walls 803 of the foundation 800 include a plurality of embedded tubes 801, for transferring thermal energy, disposed in a thermally conductive concrete 802. All, or a portion, of the walls 803 may include the tubes 801 and thermally conductive concrete 802 (e.g., the back wall 803 of FIG. 8 may include the tubes 801 and thermally conductive concrete 802). The orientation of embedded tubes 801 may vary. For example, at the floor, the embedded thermal-transfer tubes 801 may be arranged in a serpentine pattern.

Example 8: Concrete Pavers

The thermally conductive concrete composition can be applied to the formulation of most paving or enhanced-stability surfaces, including independently produced pavers for the purpose of collecting and distributing energy in the form of thermal absorption (heat accepted), or thermal exo-therm (cooling—heat rejected) as well as electrical absorption (collection and distribution of electromagnetic radiation).

Figure 9:
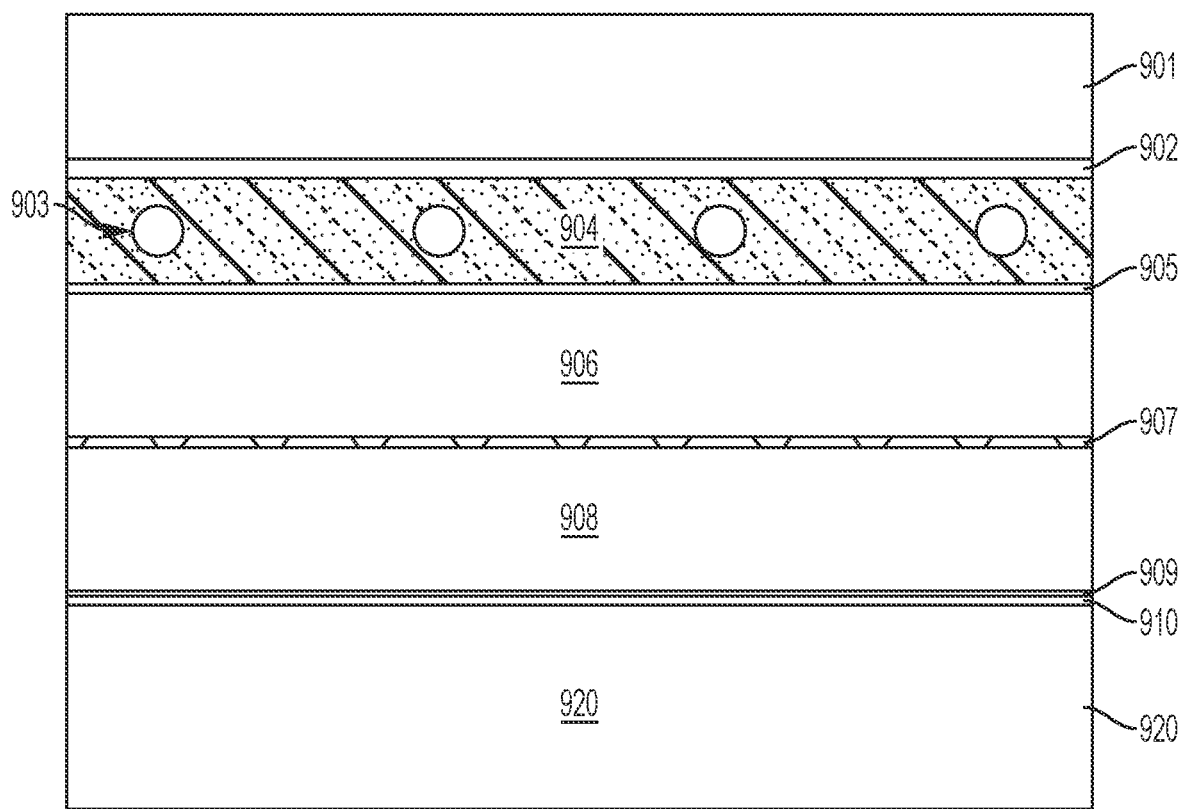
FIG. 9 shows an exemplary embodiment of a paver system, in some embodiments of the invention.

FIG. 9 shows an exemplary embodiment of a paver system. Layer 901 is a top paver, fabricated from e.g. concrete or stone. Various patterns (e.g., stamping) may be present at the top surface 901. Layer 904 is a thermally conductive concrete, optionally with a plurality of embedded tubes 903. An optional polymer layer 902 (e.g., polyurea) separates layer 901 and layer 904. Optional layers 906 and 908 are for example closed-cell foam layers. Optional layer 907 is a mechanical-strength layer (e.g., Triax or Glasgrid). Optional layer 909 is a vapor barrier, such as 10-80 mil polyurea. Optional layer 910 is a protection layer, e.g. #10 geotextile fabric. Layer 920 is earth (or another substrate) compacted to specification. Layers 902, 905, 906, 907, 908, 909, and 910 may be provided as described in U.S. Pat. No. 9,702,631.

Example 9: Concrete Furniture

Indoor and outdoor furniture, fabricated from the thermally conductive concrete composition, may incorporate electric or hydronic or piezoelectric elements that allow the surface temperature of the furniture to be controlled for comfort. The thermally conductive concrete composition may include capillary tubing or minitubes to the concrete form, allowing microclimate control of the furniture. The furniture is now indoor/outdoor climate controlled.

Example 10: Cooking Surfaces

The thermally conductive concrete composition may include capillary tubing or minitubes, allowing microclimate control of cooking or food preparation surfaces. The surface is now indoor/outdoor temperature-controlled and can be used to keep bacteria at a minimum due to a clean smooth surface. Cold stays cold and hot stays hot. Either concrete or stone over concrete can benefit from the efficient thermal control.

Example 11: Ice Rinks

Modern ice rinks can benefit greatly from thermally conductive concrete compositions. In an ice rink, ice is formed on top of a concrete floor. By including the disclosed thermally conductive concrete compositions, heat is rejected faster from the ice, therefore cooling the ice. Ice is ready sooner than with standard concrete floors. The heat rejected from the ice can go into the concrete stands and be used in radiant-heat systems to warm the occupants of indoor or outdoor seating arrangements.

Example 12: Nuclear Waste Storage

The thermally conductive concrete composition may include capillary tubing or minitubes to the concrete form, allowing microclimate control of a nuclear-waste storage vessel. Due to temperature changes and the presence of salt in some storage centers, the disclosed compositions and systems are better suited to last under conditions of changing thermal properties in the presence of salt and/or moisture.

Example 13: Geopolymers and Super Concretes

The thermally conductive concrete composition may be included in a geopolymer (synthetic aluminosilicate material). The thermally conductive concrete composition may be included in a "super concrete" material. Geopolymers and super concretes have applications in aviation and military.

Example 14: Remote Humanitarian or Military Runway

The construction of a remote humanitarian or military runway is provided in this example.

For example, polyurea may be disposed over unimproved or slightly improved ground, then foam, a reinforcement layer and a top coat of polyurea. That structure can then have a thermally conductive concrete composition directly added over it, with or without the capillary tubing for snowmelt/energy collection. This eliminates a huge amount of earth moving equipment and the need to build up the subgrade to a compaction of 90% or more (of maximum compaction) with thousands of tons of ¾-inch rock. It is possible to install a temporary runway in one week from the arrival of the liquids comprising the foam and polyurea. The reinforcing layer may be TENSAR GEOGRID 140 or 160, glass-fiber, coconut fiber, corn stalk fiber, or hemp, for example, or any long fiber placed continuously and/or amorphously throughout the foam layer.

Figure 10:
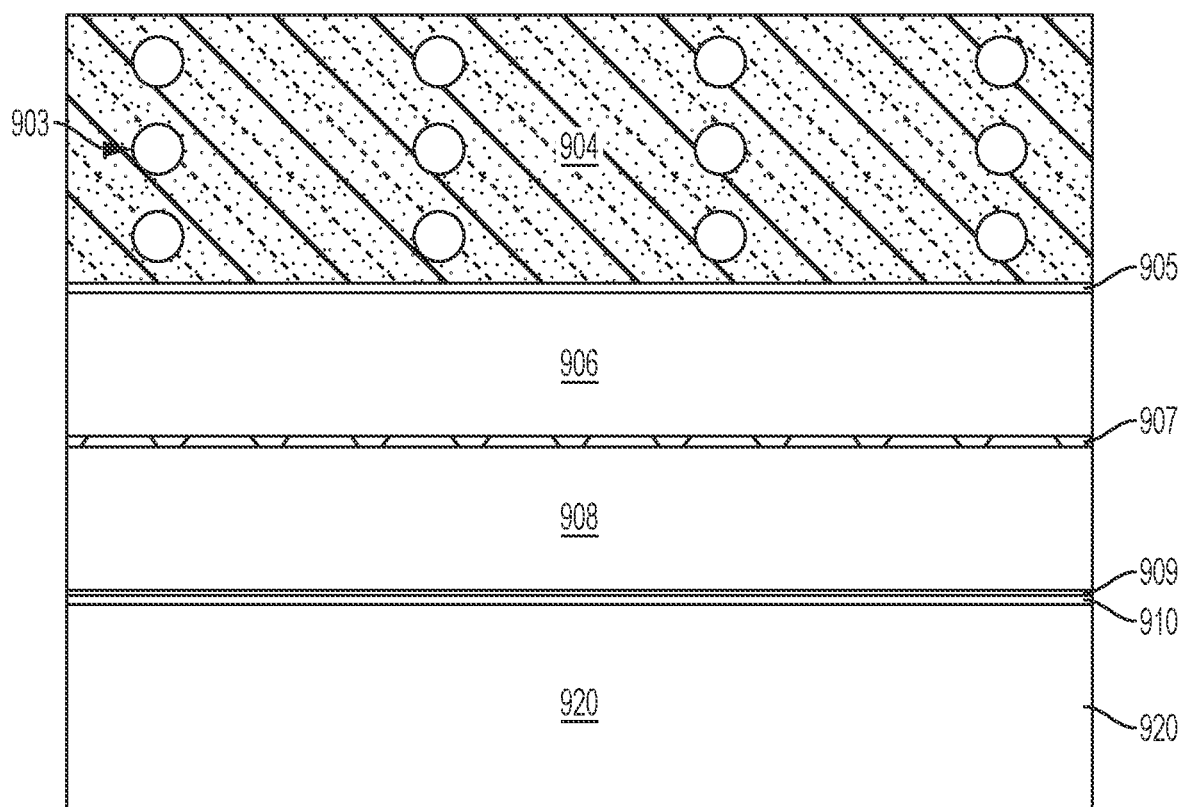
FIG. 10 shows an exemplary embodiment of a runway, in some embodiments of the invention.

FIG. 10 shows an exemplary embodiment of a runway. Layer 904 is a thermally conductive concrete, with a plurality of embedded tubes 903. A polymer layer 902 (e.g., polyurea) separates layer 901 and layer 904. Layers 906 and 908 are for example closed-cell foam layers. Layer 907 is a mechanical-strength layer (e.g., Triax or Glasgrid). Layer 909 is a vapor barrier, such as 10-80 mil polyurea. Layer 910 is a protection layer, e.g. #10 geotextile fabric. Layer 920 is earth compacted to specification. Layers 905, 906, 907, 908, 909, and 910 may be as described in U.S. Pat. No. 9,702,631.

In this detailed description, reference has been made to multiple embodiments and to the accompanying drawings in which are shown by way of illustration specific exemplary embodiments of the invention. These embodiments are described to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein. U.S. Pat. No. 9,702,631, issued Jul. 11, 2017, is hereby incorporated by reference herein.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims. In the case of conflict in definitions between the present disclosure and a dictionary or other reference, the present disclosure will be controlling.

What is claimed is:

1. A bidirectional electrical energy-transfer system comprising:
    an electrically conductive concrete, in cured form and disposed in a structural object;
    a location of electrical energy supply or demand, wherein said location of electrical energy supply or demand is physically isolated from, but in electrical communication with, said electrically conductive concrete;
    a means of transferring electrical energy between said structural object and said location of electrical energy supply or demand.

2. The bidirectional electrical energy-transfer system of claim 1, wherein said system is present as a single node in a network comprising a plurality of network nodes.

3. The bidirectional electrical energy-transfer system of claim 1, wherein said system is present as a single node in a network comprising a plurality of antennas, electrical receivers, and emitters.

4. The bidirectional electrical energy-transfer system of claim 1, wherein said electrically conductive concrete includes an electrically conductive, shock-absorbing material.

5. The bidirectional electrical energy-transfer system of claim 4, wherein said electrically conductive, shock-absorbing material is a carbonaceous material.

6. The bidirectional electrical energy-transfer system of claim 1, wherein said electrically conductive concrete comprises carbon, one or more metals and/or conductive polymers, aggregate, cement, and optionally water, wherein said carbon is present in said composition at a concentration from about 5 vol % to about 35 vol % on a dry basis, and wherein said one or more metals and/or conductive polymers are present in said composition at a concentration from about 0.5 vol % to about 10 vol % on a dry basis.

7. The bidirectional electrical energy-transfer system of claim 1, wherein said electrically conductive concrete is characterized by a compressive strength of about 2500 psi or more.

8. The bidirectional electrical energy-transfer system of claim 1, wherein said electrically conductive concrete is characterized by a flexural strength of about 500 psi or more.

9. The bidirectional electrical energy-transfer system of claim 1, wherein said electrically conductive concrete contains less than 1 vol % entrained air.

10. The bidirectional electrical energy-transfer system of claim 1, wherein said means of transferring electrical energy between said structural object and said location of electrical energy supply or demand is selected from the group consisting of metal wiring, metal mesh, metal layers, a continuous conductive network, and combinations thereof.

11. The bidirectional electrical energy-transfer system of claim 1, wherein said electrically conductive concrete functions as an integrated antenna without a ground plane.

12. The bidirectional electrical energy-transfer system of claim 1, wherein said electrically conductive concrete is capable of capacitively storing electricity when exposed to electromagnetic radiation.

13. The bidirectional electrical energy-transfer system of claim 1, wherein said electrically conductive concrete is capable of wirelessly receiving electricity via electromagnetic fields.

14. The bidirectional electrical energy-transfer system of claim 1, wherein said electrically conductive concrete is capable of wirelessly transmitting electricity via electromagnetic fields.

15. The bidirectional electrical energy-transfer system of claim 1, said system further comprising a photovoltaic material for converting incoming light into electricity.

16. The bidirectional electrical energy-transfer system of claim 1, said system further comprising a plurality of embedded conductors selected from the group consisting of metal wiring, metal mesh, metal layers, a continuous conductive network, and combinations thereof.

17. The bidirectional electrical energy-transfer system of claim 1, wherein said system is present in a solar-energy collection system.

18. The bidirectional electrical energy-transfer system of claim 1, wherein said system is present in a bridge, roadway, driveway, or parking lot.

19. The bidirectional electrical energy-transfer system of claim 1, wherein said system is present in a commercial aviation runway.

20. The bidirectional electrical energy-transfer system of claim 1, wherein said system is present in a military aviation runway.

* * * * *